Feb. 12, 1952     A. B. ABEL     2,585,208
IMPLEMENT FRAME CONSTRUCTION
Filed Oct. 8, 1947     3 Sheets-Sheet 1
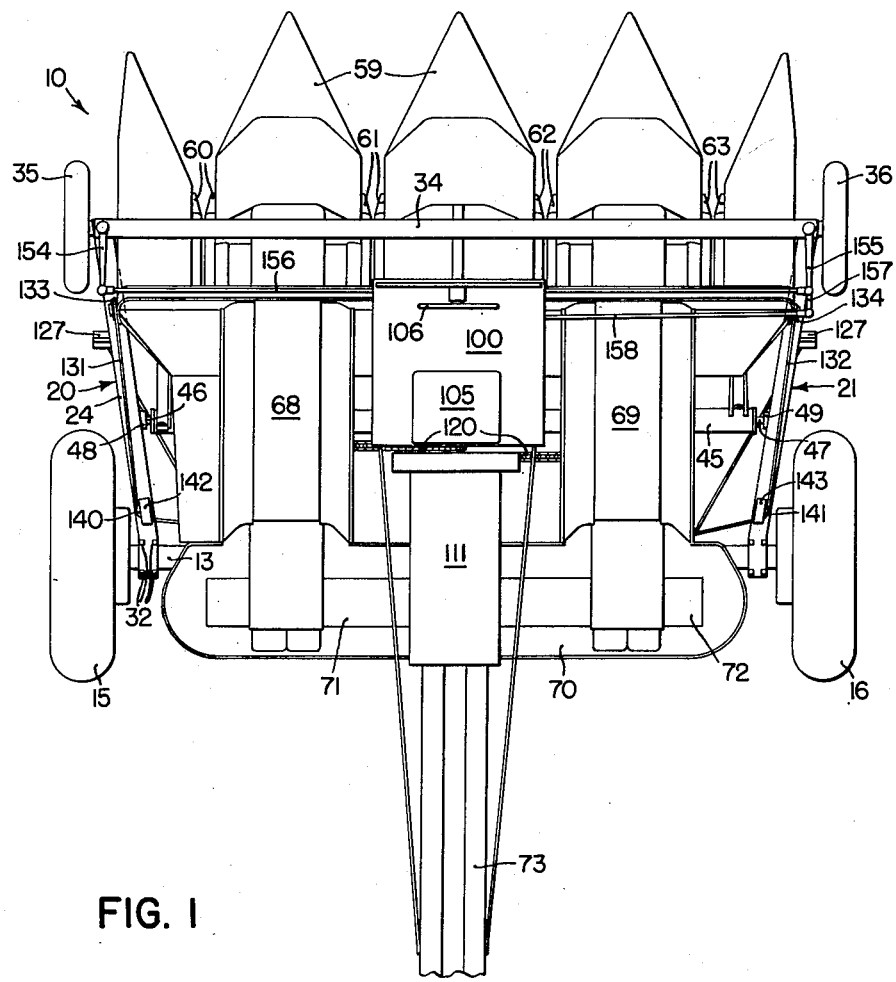
FIG. I
*INVENTOR.*
ARTHUR B. ABEL
BY
ATTORNEY Feb. 12, 1952 A. B. ABEL 2,585,208
IMPLEMENT FRAME CONSTRUCTION
Filed Oct. 8, 1947 3 Sheets-Sheet 2
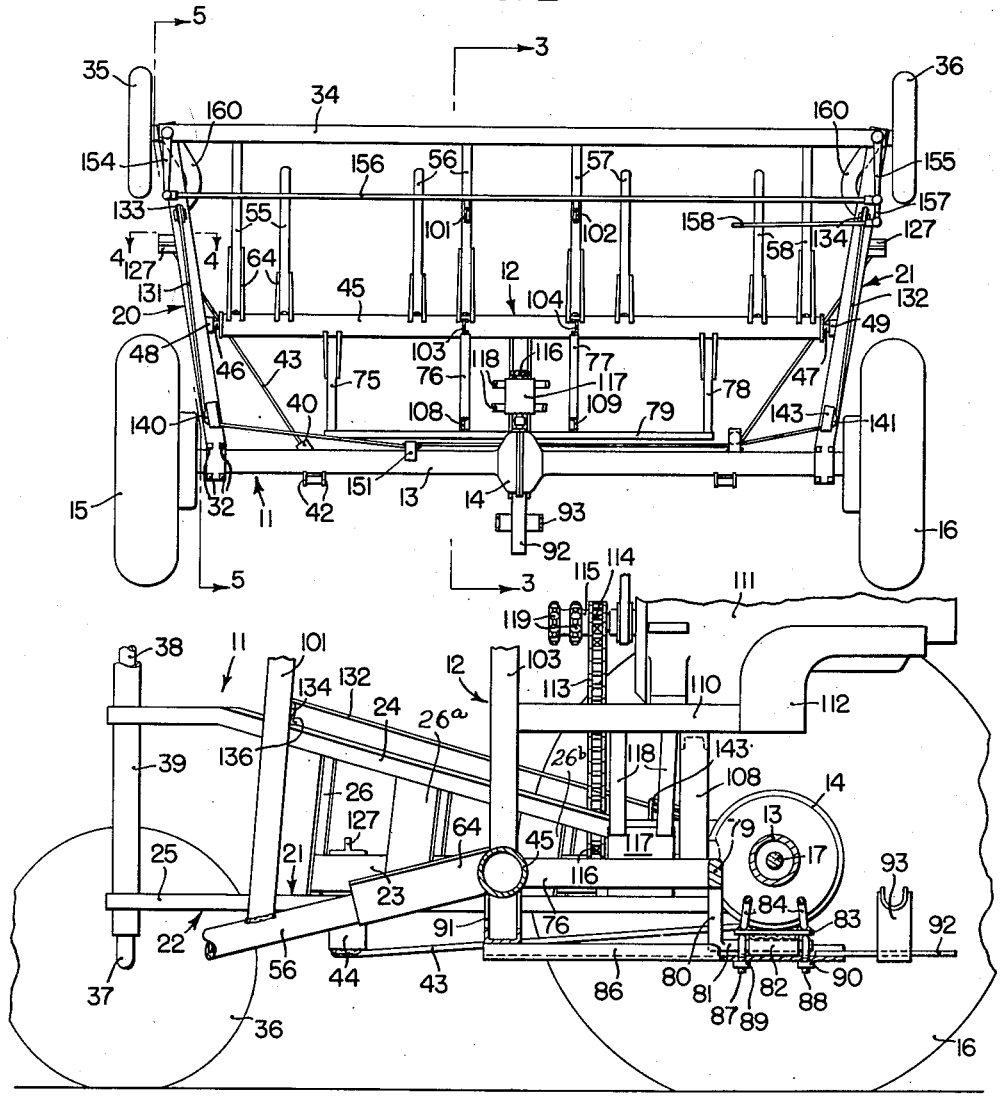
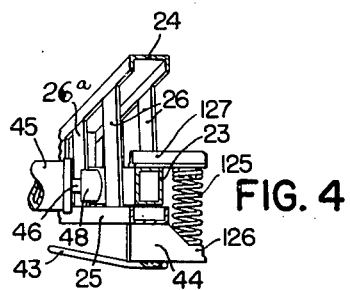
*INVENTOR.*
ARTHUR B. ABEL
BY
*C. T. Parker*
ATTORNEY Feb. 12, 1952          A. B. ABEL          2,585,208
IMPLEMENT FRAME CONSTRUCTION
Filed Oct. 8, 1947          3 Sheets-Sheet 3
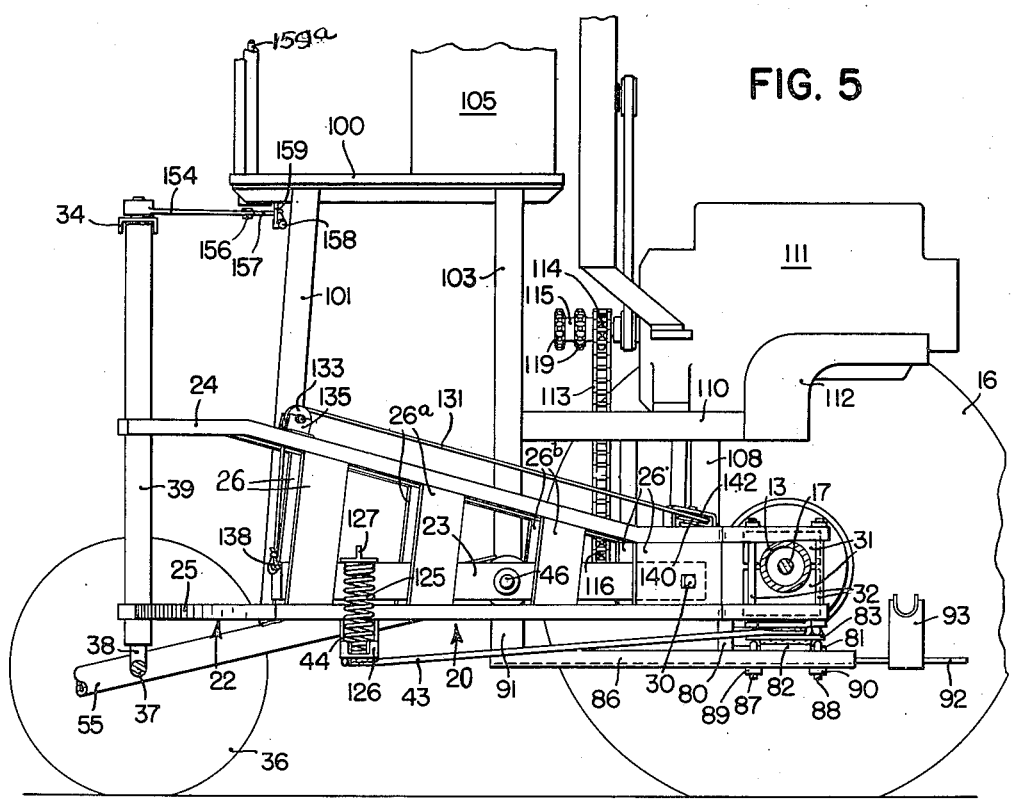
FIG. 5
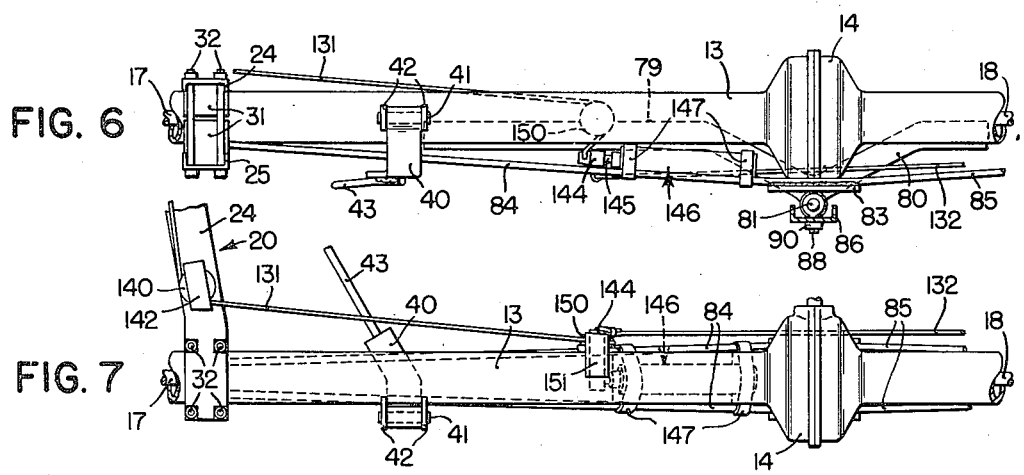
FIG. 6
FIG. 7
INVENTOR.
ARTHUR B. ABEL
BY
ATTORNEY Patented Feb. 12, 1952

2,585,208

UNITED STATES PATENT OFFICE 2,585,208

IMPLEMENT FRAME CONSTRUCTION

Arthur B. Abel, Fairmont, Minn.

Application October 8, 1947, Serial No. 778,673

25 Claims. (Cl. 56—15)

The present invention relates generally to implement supporting means and more particularly to wheel supported frames for mobile implements, and has for its principal object the provision of a novel and improved chassis frame and means for mounting an agricultural implement or the like thereon.

Heretofore, some difficulty has been encountered in designing an adequate chassis for a large implement, such as a self-propelled corn harvester or combine, which is comparatively light in weight and inexpensive to manufacture, but at the same time protects the intricate operating mechanism of the implement from distortion and misalignment due to stresses set up by the movement of the implement over rough uneven ground. The common method of solving this problem has been to provide a frame which is strong and rigid enough to hold the operating mechanism in proper working position and to provide a tricycle type wheel support which is adapted to follow the contour of the ground without excess distortion.

Some types of implements, however, require a four wheel mounting to provide adequate stability under certain working conditions, but the four wheel chassis frame must be sufficiently flexible to substantially equalize the weight of the implement upon the four supporting wheels, in order to avoid excess stresses in the frame. However, the operating mechanism must be properly mounted on a flexible chassis frame in order to avoid misalignment during operation.

It is a further object of my invention, therefore, to provide an extremely stable four wheel chassis frame, which is sufficiently flexible to distribute the load upon the four wheels, but which does not cause distortion of the implement body and misalignment of the operating mechanism during operation. In the accomplishment of this object, I have provided a chassis frame in which there is provision for vertical movement of the four wheels relative to each other, while the operating mechanism of the implement is mounted on a separate implement frame which is supported at only three points on the chassis frame. Thus, the implement frame can be made sufficiently rigid to hold the operating parts in proper relation to each other but the flexing of the chassis frame does not tend to distort the implement frame.

These and other objects and advantages of my invention will be apparent to those skilled in the art after a consideration of the following description, in which reference is had to the drawings appended hereto, in which Figure 1 is a top plan view of a self-propelled corn harvester embodying the principles of the present invention;

Figure 2 is a top plan view of the chassis and implement frames with the corn harvesting mechanism removed;

Figure 3 is a sectional elevational view taken along a line 3—3 in Figure 2 and drawn to an enlarged scale;

Figure 4 is a fragmentary sectional elevational view taken along a line 4—4 in Figure 2 and drawn to an enlarged scale;

Figure 5 is a sectional elevational view taken along a line 5—5 in Figure 2 and drawn to an enlarged scale;

Figure 6 is an enlarged rear elevational view showing a portion of the rear axle housing; and Figure 7 is a top view of the axle housing portion shown in Figure 6.

Referring now to the drawings, the corn harvester is indicated in its entirety by reference numeral 10 and comprises a four wheeled chassis frame 11 and an implement frame 12 mounted on the chassis frame 11 at three spaced points, as will be explained later.

The chassis frame comprises a main transverse structural member 13 in the form of an axle housing of the more conventional banjo type having an enlarged differential housing 14 substantially at the center thereof. The axle housing 13 is carried in any suitable manner on a pair of ground-engaging supports in the form of traction means, here propelling wheels 15, 16, which are journaled at opposite ends thereof, respectively, and are driven by suitable drive axles, 17, 18, respectively, disposed within the axle housing 13, all of which provides a wheel-supported member for the rear of the vehicle. Inasmuch as the mechanism for driving the wheels is not an essential part of the present invention, a detailed description is not considered necessary.

Extending forwardly from opposite ends, respectively, of the axle housing 13 is a pair of side arms 20, 21, which are also portions or elements of the chassis frame 11.

Each of the side arms 20, 21 comprises a pair of relatively vertically shiftable elements in the form of beams 22, 23. The first beam 22 comprises a pair of upper and lower structural channel members 24, 25, which are spaced apart vertically but converge toward their rear ends and are rigidly interconnected by laterally spaced side elements in the form of plates 26, 26a and 26b, which are fixed, as by welding, to the flanges of the channel members 24, 25. Thus, the first beam 22 is of a hollow box construction, and the second beam 23 lies within the beam 22 between the upper and lower channel members 24, 25 and between the side elements 26, 26a and 26b. As best shown in Figure 4, the second beam 23 is of a rectangular cross section and is tubular, and the rear end of the tubular beam 23 is pivotally connected by a pivot bolt 30 to the first beam 22. The pivot pin 30 is supported in rear side plates 26', which are rigid with the upper and lower members 24, 25. The rear end of each side arm is swingably mounted on the axle housing 13 on a pair of opposed bearing blocks 31 which are secured between the upper and lower channel members 24, 25 by means of four clamping bolts 32 extending vertically between the channel members adjacent the corners of the bearing blocks 31.

The forward ends of the side arms 20, 21 are carried on a pair of ground-engaging supports in the form of dirigible wheels 35, 36. Each of the dirigible wheels is journaled on an axle 37 mounted on the lower end of a vertical spindle 38, which is rotatably disposed within a vertical frame or sleeve member 39, rigidly fixed, as by welding, adjacent the forward ends of the upper and lower channel members 24, 25 and extends upwardly therefrom. The upper ends of the sleeves 39 on the two side arms 20, 21 are interconnected by means of a transverse frame member 34, which is preferably fixed, as by welding, to the upper ends of the sleeves 39, but which has sufficient length and flexibility to permit a limited amount of vertical swinging movement of one of the side arms relative to the other.

Each of the side arms 20, 21 extends forwardly from the axle housing 13, but inclines outwardly to position the front wheels 35, 36 in fore and aft alignment with the rear traction wheels 15, 16, respectively. Each of the side arms is braced against lateral movement by means of an inclined bracing rod 43 which is secured at its forward end to a depending bracket 44 beneath the lower channel member 25 intermediate the ends of the latter, and extends rearwardly and inwardly and is welded to a hanger 40, which is pivotally connected by a transverse pivot pin 41 to a pair of lugs 42 mounted, as by welding, on the rear of the axle housing 13. The axis of the pivot pin 41 is sufficiently close to the axis of the axle housing 13 to permit the brace rod 43 to swing vertically with the associated side arm when the latter swings angularly about the axis of the axle housing 13.

It will now be evident that the chassis frame 11 is generally rectangular and is supported on the ground at four spaced points and rendered mobile by its four wheels 15, 16, 35, 36, and that there is sufficient flexibility in this frame to accommodate unevenness in the surface of the ground over which the machine travels, for any one of the four wheels, upon encountering a high spot in the ground, can rise to a limited extent without lifting any of the other wheels off the ground, or without unduly stressing the frame.

The implement frame 12 comprises a main transversely disposed member in the form of a tubular beam 45, extending between the two side arms 20, 21 and pivotally mounted at opposite ends thereof, respectively, on a pair of side portions including gudgeons 46, 47 which are journaled in suitable bearing sleeves 48, 49 on the rectangular tubular beams 23 disposed within the box shaped beams 22 of the side arms 20, 21, respectively.

The implement frame beam 45 is provided with a plurality of pairs of laterally spaced forwardly extending pipe frame members 55, 56, 57, 58, which support the gatherers 59 and the four pairs of snapping rolls 60, 61, 62, 63 of the four row corn harvester. The pipe frame members 55, 56, 57, 58 are provided with reenforcing cradles 64 which are rigidly welded to the transverse tubular member 45 and serve to strengthen the pipe frame members which extend forwardly as cantilever beams.

Inasmuch as the corn harvesting mechanism does not form an essential part of the present invention, the details of this mechanism are not considered necessary in this disclosure. It is believed to be sufficient to say that the ears of corn snapped from the four rows of stalks which enter the four pairs of snapping rolls 60, 61, 62, 63, are transmitted to two pairs of husking units, indicated generally by reference numerals 68, 69, from which the husked ears drop into a transverse hopper 70 behind and beneath the husking units 68, 69 and are conveyed laterally inwardly within the hopper 70 by means of a pair of oppositely moving conveyor belts 71, 72, which convey the ears to a centrally disposed, upwardly and rearwardly extending wagon elevator 73.

The implement frame 12 also includes a rearwardly extending portion comprising a plurality of rearwardly extending frame members 75, 76, 77, 78, which are interconnected at their rearward ends by a transverse frame member 79, the central portion 80 of which is curved downwardly beneath the forward portion of the differential housing 14, and has a rearwardly extending stub shaft 81 rigidly fixed to the lower apex of the downwardly offset portion 80 and journaled in a sleeve 82 which is rigidly fixed, as by welding, to a securing plate 83, which is secured to the bottom of the differential housing 14. The journaled shaft 81 comprises means providing a third pivotal support for the implement frame 12. The plate 83 is braced by two pairs of laterally extending bracing rods 84, 85, which are inclined upwardly and laterally in relatively opposite directions and are rigidly secured by any suitable means to the outer ends of the axle housing 13. A longitudinally extending structural channel member 86 underlies the sleeve 82 and is secured to the stub shaft 81 by means of a pair of eyebolts 87, 88, which receive the shaft 81 therethrough at opposite ends, respectively, of the sleeve 82 and extend downwardly through suitable openings in the channel member 86. A pair of nuts 89, 90 engage the lower threaded ends of the eyebolts 87, 88, respectively, beneath the channel member 86. The forward end of the channel member 86 is rigidly attached to a leg 91, which depends from the main transverse tubular beam 45 of the implement frame and is rigidly fixed thereto.

It will now be evident that the implement frame 12 is mounted on the chassis frame 11 at three points of support, namely, the two gudgeons 46, 47 which are pivoted to the side arms 20, 21 on substantially transversely aligned axes and on the fore and aft extending axis of the supporting sleeve 82, these three points representing the apices of an imaginary triangle superposed as respects the mobile frame. The bearings 48, 49 in which the gudgeons are mounted are sufficiently loose to permit independent vertical swinging movement of the side arms 20, 21, which action also results in an angular movement of the stub shaft 81 within the sleeve 82 about the fore and aft extending axis of the latter. It will be noted that vertical movement of the side arms relative to each other does not transmit any excess stresses to the implement frame 12.

The lower channel member 86 is extended rearwardly behind the differential housing 14 and serves as a support for a plate 92 on which a bracket 93 is mounted, on which the lower end of the wagon elevator 73 is suitably supported. Further details of the wagon elevator are not considered necessary inasmuch as they form no essential part of the present invention.

The implement frame also includes an operator's platform 100 which is mounted on four substantially vertical legs 101, 102, 103, 104. Two of the legs 101, 102 are rigidly fixed to the two inner pipe frame members on opposite sides of the central axis of the machine, while the rear two legs 103, 104 extend vertically from the main transverse tubular member 45. The operator's platform 100 carries the operator's seat 105 and a steering wheel 106, in addition to the various other controls, which need not be disclosed herein in detail, since they are well known to those skilled in the art.

A third pair of vertical legs 108, 109 are rigidly fixed to the two inner horizontal members 76, 77 and to the transverse frame member 79 for supporting a motor supporting frame 110, the forward end of which is supported on the intermediate pair of vertical legs 103, 104. An internal combustion engine 111 is mounted on suitable brackets 112 on the frame 110, and drives the rear traction wheels 15, 16 through a power transmitting chain 113 trained over a sprocket 114 mounted on the crankshaft 115 of the engine and over a lower sprocket 116 which transmits power from the engine rearwardly through a transmission unit 117 and suitable conventional differential mechanism within the housing 114 to the drive axles 17. The transmission unit 117 is supported from the motor supporting frame 110 by means of depending frame members 118, by means of which the transmission unit 117 is held rigidly on the implement frame. Another pair of drive sprockets 119 are fixed to the crankshaft 115 and furnish power through a pair of oppositely extending power transmitting chains 120 to the corn harvesting mechanism on relatively opposite sides of the center line of the implement, respectively.

The weight of the forward portion of the implement frame 12 is transmitted to the front wheel supporting beams 22 in approximately balanced relation, through weight transfer means including a pair of compression springs 125, which are seated in a suitable spring-receiving recess in an extension 126 of the bracket 44 beneath the lower channel member 25. The upper end of each spring 125 carries the end of a short transversely disposed arm 127 rigidly fixed to the top of the associated rectangular beam 23, as by welding or the like. The springs 125 provide a limited amount of resilience between the implement frame 12 and the chassis frame 11 to cushion the shocks as the machine travels over uneven ground.

The implement frame is raised and lowered to control the height of the gatherers 59 and snapping rolls relative to the ground, by power-actuated means including hydraulic mechanism acting to exert an upward or lifting force between the two beams 22, 23 of each side arm, to raise and lower the rectangular beam 23 about its pivot support 30. This is accomplished by means of a pair of lifting cables 131, 132 extending outwardly over the tops of the upper channel members 24, respectively, and trained over a pair of sheaves 133, 134, respectively, journaled in brackets 135, 136, which are rigidly attached to the tops of the two channel members 24 of the side arms 20, 21, respectively. The cables 131, 132 extend downwardly through suitable openings in the associated supporting channels and are secured to the forward ends of the rectangular beams 23, respectively, as indicated at 138, see Figure 5. The cables 131, 132 are trained inwardly around a pair of sheaves 140, 141, which are journaled in brackets 142, 143 on top of the upper channel members 24 adjacent their rear ends, respectively. The right hand cable 132 extends laterally inwardly from the sheaves 141 and is secured by a clamp fitting 144 to the piston rod 145 of a hydraulic ram 146, which is secured by brackets 147 to the underside of the axle housing 13.

The left hand cable 131 extends laterally inwardly from the sheave 140 and passes downwardly over a sheave 150 journaled on a bracket 151 rigidly mounted on the front side of the axle housing 13 above the clamping device 144, to which the end of the cable 131 is secured, as best shown in Figures 6 and 7.

It will be evident that when fluid under pressure is introduced to the ram 146 by suitable means under the control of the implement operator, the expansion of the ram causes a rearward pull on the cables 131, 132, which raise the rectangular beams 23 within the wheel supported beams 22, causing the beams 23 to swing upwardly about their pivot members 30, thereby raising the gudgeons 46, 47 to raise the implement frame beam 45. Any suitable hydraulic control mechanism can be employed for this purpose and since this mechanism is well known to those skilled in the art and has no bearing upon the present invention, the details thereof will not be explained herein.

The upper ends of the spindles 38 extend above the transverse channel member 34 and carry a pair of steering arms or levers 154, 155 rigidly fixed thereto and extending rearwardly therefrom. The rear ends of the steering arms are interconnected by a transverse connection such as a tie rod 156, pivotally connected at opposite ends thereof, respectively, to the two arms 154, 155. The arm 155 has a rearward extension 157 which is pivotally connected to a steering link 158, which extends laterally inwardly beneath the operator's platform 100 and is connected to a control arm 159, the latter being operatively connected to the steering wheel 106 by a vertical shaft 159a, all of which provides steering control means for the front wheels.

It will be noted that both the transverse chassis frame member 34 and the steering tie rod 156 extend transversely over the top of the implement frame and are spaced close enough together so that the transverse member 34 absorbs any reaction to a force applied to the tie rod 156 to steer the wheels 35, 36, thereby preventing any undesirable looseness in the steering connections.

In order to provide clearance for the dirigible wheels 35, 36, the lower channel members 25 are offset inwardly at their forward ends, as indicated at 160 (Figure 2).

The foregoing description will make it evident to those skilled in the art that the four wheeled flexible chassis frame with its widely set wheels provides maximum stability in operation, while the three point support for the implement frame on the chassis frame prevents any excess stresses from being developed in the rigid implement frame. I do not intend my invention to be limited to the particular embodiment shown and described herein, except as set forth in the following claims.

I claim:

1. Implement supporting means comprising in combination, a transverse wheel-supported member, a pair of laterally spaced, longitudinally extending side arms mounted on said member by means providing for relative angular movement about a transverse axis, each of said side arms comprising a pair of beams shiftable angularly relative to each other, a pair of ground engaging supports, one mounted on one beam of one pair of beams and the other mounted on one beam of the other pair of beams, an implement frame, means pivotally mounting said frame at opposite ends, respectively, on the other beam of each pair of beams, means for transferring weight between each pair of beams, and means swingably mounting said frame on said wheel supported member between said side arms.

2. Implement supporting means comprising in combination, a chassis frame including a transverse member carried at opposite ends, respectively, on a pair of supporting wheels and a pair of side arms mounted on said member by means providing for relative movement about a transverse axis, each of said side arms comprising a pair of beams extending forwardly from said member and shiftable vertically angularly relative to each other, a supporting wheel mounted on one beam of each of said pairs of beams, an implement frame disposed between said side arms and pivotally mounted at opposite sides, respectively, on the other beam of each pair, means for transferring weight load between each pair of associated beams, and means swingably mounting said implement frame on said wheel supported member between said side arms.

3. The combination set forth in claim 2, including the further provision that said weight transferring means comprises a spring for each pair of beams acting against one of said beams and reacting against the other.

4. The combination set forth in claim 2, including the further provision of power actuated means acting against one beam of each of said pairs and reacting against the other beam for raising said implement frame relative to said chassis frame.

5. The combination set forth in claim 2, including the further provision of a lifting cable attached to one of said beams, a sheave journaled on the associated beam over which said cable is trained, and means for applying a tensional force to said cable to swing said pair of beams relative to each other to raise said implement frame relative to said chassis frame.

6. Implement supporting means comprising in combination, a chassis frame including a transverse member carried at opposite ends, respectively, on a pair of supporting wheels and a pair of side arms mounted on said member by means providing for relative movement about a transverse axis, each of said side arms comprising a first beam swingably mounted on said transverse member and including upper and lower structural members rigidly interconnected by laterally spaced side elements, a vertically disposed sleeve rigidly connecting the forward ends of said members, a spindle extending through said sleeve and journaled therein, a wheel supporting axle mounted on the lower end of said spindle, dirigible connections at the upper end of said spindle, a second beam disposed within said first beam between said upper and lower structural members and between said side elements, means pivotally mounting said second beam on said first beam providing for relative vertical swinging movement therebetween, a transverse structural member interconnecting the upper portions of the sleeves of the two side arms, an implement frame disposed between said side arms and extending forwardly under said transverse structural member, means pivotally mounting said implement frame at opposite sides, respectively, on said second beams of each side arm, means mounting said implement frame on said transverse member of said chassis frame intermediate said side arms to provide a third point of support for said implement frame, and means acting against said second beams of each side arm and reacting against said first beams for determining the relative angular positions of each associated pair of beams to determine the position of said implement frame relative to said chassis frame and therefore relative to the ground.

7. Implement supporting means comprising a chassis frame including a pair of wheeled frame sections, means flexibly connecting said sections together for limited relative vertical movement, weight-transfer means supporting each frame section at least in part on the other, an implement frame, and means flexibly connecting the implement frame to one of the frame sections for movement with respect to both sections.

8. Implement supporting means comprising a chassis frame including a pair of wheeled frame sections, means flexibly connecting said sections together for limited relative vertical movement, one of said sections including a pair of transversely spaced fore and aft extending frame members, weight-transfer means supporting said fore and aft frame members on the other frame section, an implement frame, means connecting the implement frame to one of the frame sections for movement with respect to both sections, and means including a generally transverse frame member crossing over the implement frame and cross-connecting the aforesaid fore and aft frame members.

9. Implement carrying means comprising a chassis frame having a pair of wheel-supported frame sections, means flexibly connecting said sections together for limited relative vertical movement, weight-transfer means supporting each frame section in part on the other, means including elements of at least one of said sections providing a pair of generally fore and aft extending and generally laterally spaced frame members, means including a transverse support connected at opposite end portions to said fore and aft members, an implement frame, and means connecting said implement frame and transverse support for movement of the implement frame with respect to both frame sections.

10. Implement carrying means comprising a pair of wheeled frame sections arranged together to provide a chassis frame having front and rear ends, means including elements of one of said sections providing a pair of generally fore and aft extending and laterally spaced frame members, resilient weight-transfer means interconnecting said sections for limited relative vertical springing and including a transverse support cross-connecting said fore and aft frame members substantially midway between the front and rear ends of the chassis frame, and an implement frame flexibly connected to said support for movement relative to both frame sections.

11. An implement-supporting vehicle comprising a frame having front and rear ends and made up of frame elements having end portions arranged at the four corners of a rectangle, said elements being interconnected to provide for vertical flexure of corner portions of the frame relative to other portions, means at each of the four corner portions of the frame including rolling ground supports for rendering the frame mobile, an implement frame positioned to be carried by the mobile frame, and means including three pivoted supports mounting the implement frame on the mobile frame at three points spaced apart transversely and fore and aft and representing generally the apices of an imaginary triangle superposed as respects the rectangular mobile frame.

12. A self-propelled vehicle for carrying agricultural implements, comprising: a structural member disposed transversely as respects the line of travel of the vehicle and having traction means at each of its opposite end portions; a pair of transversely spaced apart ground-engaging means positioned forwardly of the transverse member, each ground-engaging means including a generally vertical member; a pair of laterally spaced apart side frame elements extending fore and aft between the transverse rear member and the vertical member, each including upper and lower members diverging forwardly in a longitudinal vertical plane from rear portions adjacent the transverse rear member to vertically spaced apart front portions on the proximate vertical member; means sustaining the rear portions of said side members on the transverse rear member; means sustaining the front portions of the side members on the respective vertical member; means associated with each side frame element including a longitudinal arm having a rear end portion adjacent to the rear transverse member and a front portion terminating short of the vertical member at that side and interposed between the upper and lower frame members; means connecting the rear portion of each arm to the rear transverse member for movement vertically relative to its associated side frame element; and a pair of transversely alined resilient means, one for each side frame element and associated arm, for resiliently sustaining the arms respectively on the side frame elements.

13. Implement supporting means comprising, in combination: a transverse wheel-supported member; a pair of laterally spaced, longitudinally extending side arms, each having front and rear ends and each mounted at one of its ends on said member by means providing for relative angular movement about a transverse axis; ground engaging supports mounted on the other ends of said arms, respectively; an implement frame having a first portion adjacent to and intermediate the ends of the transverse member and side portions spaced longitudinally from said first portion and transversely alined and spaced to lie respectively adjacent to the side arms; means intermediate the ends of the side arms pivotally mounting said frame at its side portions on said side arms on a transverse axis; and means pivotally mounting said frame at its first named portion on said wheel-supported member on a longitudinally extending axis.

14. Implement supporting means comprising, in combination: a chassis frame including a transverse member carried at opposite ends, respectively, on a pair of supporting wheels, and a pair of side arms, each having front and rear ends and each mounted on said member by means providing for movement of said arms relative to each other and relative to the transverse member in upright planes; said side arms extending longitudinally from said transverse member and respectively having supporting wheels mounted near their other ends; an implement frame having a first portion adjacent to and intermediate the ends of the transverse member and side portions spaced longitudinally from said first portion and transversely alined and spaced to lie respectively adjacent to the side arms; means articulately connecting said side portions respectively to said side arms so that said side portions may respectively rise and fall as the side arms move in their respective upright planes, and supporting means articulately connecting said first portion of said implement frame to said transverse member.

15. Implement supporting means comprising, in combination: a chassis frame including a transverse member carried at opposite ends, respectively, on a pair of supporting wheels and a pair of longitudinal side arms, each arm having front and rear ends and each mounted at one end on said member by means providing for relative movement about a transverse axis; said side arms extending longitudinally in the same direction from said member and having supporting wheels respectively mounted near their other ends, an implement frame disposed between said side arms and having three supporting portions arranged as a triangle in a substantially horizontal plane with one portion substantially centered between the side arms and the other two portions respectively adjacent to the side arms and transversely alined in longitudinally spaced relation to said one portion; a pair of support means pivotally mounting said implement frame at said other two portions respectively on said side arms on transversely disposed axes providing for relative vertical movement between each of said side arms and said implement frame; and third support means connecting said one portion of said implement frame to said chassis frame intermediate the side arms and spaced longitudinally from said pair of support means.

16. The combination set forth in claim 15, including the further provision of means acting between said implement frame and said side arms for exerting an upwardly acting force on said implement frame.

17. The combination set forth in claim 15, including the further provision of power actuated means positioned to exert a lifting force on said implement frame and a reaction force upon said chassis frame.

18. The combination set forth in claim 15, including the further provision of power actuated lifting means connected between each of said side arms and the associated pivot mounting means for said implement frame for raising the latter relative to said side arms.

19. The combination set forth in claim 15, including the further provision of a pair of vertical members rising respectively from the side arms at the ends of said arms that are remote from the transverse member; and a transverse element extending over the implement frame and connected at opposite ends respectively to said vertical members.

20. Implement supporting means comprising, in combination: a chassis frame including a transverse rear axle member carried at opposite ends respectively on a pair of supporting wheels, and a pair of longitudinal side arms, each having front and rear ends and each articulately mounted at its rear end on said axle member to rise and fall relative to each other respectively in upright planes; said side arms extending forwardly from said axle member and respectively having dirigible supporting wheels mounted near their forward ends; each of said dirigible wheels having a generally vertical supporting spindle including an upper end above the respective dirigible wheels and a steering lever attached to said upper end; a transverse steering connection above the dirigible wheels and cross-connecting said levers for steering said dirigible wheels; a transverse front frame member above the dirigible wheels and having opposite ends interconnected to said side arms to cross-brace said side arms and having flexibility to accommodate said rise and fall of said side arms; an implement frame disposed between said side arms and extending fore and aft beneath said transverse frame member and said steering connection, means flexibly mounting said implement frame on said chassis frame including a pair of transversely spaced apart and alined articulated elements intermediate the front and rear transverse members and connected respectively to the side arms; an operator's platform positioned over the implement frame above the level of and behind the transverse front frame member; means rising from the implement frame for sustaining the operator's platform rigidly on said implement frame; and steering control means mounted on said operator's platform and connected by means including said transverse steering connection, for steering said wheels.

21. Implement supporting means comprising, in combination: a chassis frame including a transverse rear axle member carried at opposite ends respectively on a pair of rear supporting wheels; and a pair of side arms mounted on said axle member by means providing for relative movement of said arms respectively in longitudinal upright planes; said side arms extending forwardly from said axle member and respectively having dirigble front supporting wheels mounted near their forward ends; a pair of generally vertical sleeve members extending upwardly respectively from the forward ends of and rigid with said arms, each of said front wheels having a vertical supporting spindle extending up through its associated sleeve member and a steering lever mounted at the top of said spindle; a transverse steering connection between said levers for steering said front wheels; a transverse front frame member interconnecting the upper portions of said sleeves to cross-brace the sleeves, said front frame member including flexibility to accommodate said relative movement between the side arms; an implement frame disposed between said side arms and extending fore and aft beneath said transverse frame member and steering connection, and including three portions arranged respectively at the apices of a triangle with two of said portions transversely alined and transversely spaced apart to lie respectively adjacent to the side arms at points on the latter intermediate the front and rear wheels and with the third point centered between the side arms and spaced rearwardly from said two portions; a pair of transversely alined support means articulately mounting said implement frame respectively at said two portions on said side arms and providing for relative vertical movement between each of said side arms and said implement frame; third support means articulately connecting said third frame portion to said chassis frame rearwardly of said pair of support means and centered between said side arms, an operator's platform rigidly mounted on said implement frame behind the transverse front member and substantially above the transverse alinement of said pair of support means; and a steering control means mounted on said operator's platform and connected by means including said transverse connection to said levers for steering said wheels.

22. Implement supporting means, comprising: a longitudinal chassis frame having front and rear ends, a pair of front supporting wheels and a pair of rear supporting wheels journaled on said frame; said frame including front and rear articulated portions, said front and rear pairs of wheels being mounted respectively on and sustaining said front and rear frame portions; a rigid unitary implement frame having three supporting elements spaced apart from front to rear and from side to side to represent the apices of a triangle; first flexible mounting means on one frame portion for supporting said implement frame on said chassis frame at only one of said three spaced supporting elements; and a pair of additional flexible mounting means on the other frame portion and spaced longitudinally from said first flexible means for supporting said implement frame at only the two other of said supporting elements.

23. Implement carrying means, comprising: a chassis frame having front and rear ends and opposite sides and including at one end a transverse member; a first pair of wheels sustaining the transverse member at opposite sides of the chassis frame; said chassis frame further including a pair of side arms respectively at opposite sides thereof and extending longitudinally to the other end of said chassis frame; a second pair of wheels sustaining said side arms at said other end of the chassis frame; an implement-carrying frame element cross-connecting and sustained on the side arms intermediate the first and second pairs of wheels; and means articulately sustaining said element on the transverse member and including a connection on a fore and aft extending pivot axis intermediate the wheels of said first pair.

24. Implement carrying means, comprising: a transverse axle member having opposite ends; a first pair of wheels respectively at and sustaining the axle member ends; a pair of side arms spaced apart transversely and extending in the same direction substantially normal to the axle member, each side arm having opposite, longitudinally spaced ends; means closely proximate to one of said wheels for connecting one end of one side arm directly to that end of the axle member proximate to said one wheel; means closely proximate to the other of said wheels for articulately connecting the corresponding end of the other side arm directly to the other end of the axle member to provide for rise and fall of the side arms relative to each other; a second pair of wheel means respectively at and sustaining the other ends of the side arms; a transverse implement-carrying element having end portions respectively proximate to portions of the side arms intermediate the second pair of wheels and the connections of the side arms to the transverse axle member; and sustaining means spaced transversely apart on the order of the end portions of the transverse element and respectively directly connecting said element end portion exclusively to said intermediate portions of the side arms.

25. Implement supporting means comprising in combination, a transverse wheel-supported member, a pair of laterally spaced, longitudinally extending side arms mounted on said member by means providing for relative angular movement about a transverse axis, each of said side arms comprising a pair of beams shiftable angularly relative to each other, a pair of ground engaging supports, one mounted on one beam of one pair of beams and the other mounted on one beam of the other pair of beams, an implement frame, means pivotally mounting said frame at opposite ends, respectively, on the other beam of each pair of beams, and means for transferring weight between each pair of beams.

ARTHUR B. ABEL.

REFERENCES CITED

The following references are of record in the file of this patent:

UNITED STATES PATENTS

| Number | Name | Date |
| --- | --- | --- |
| 646,081 | Sperry | Mar. 27, 1900 |
| 1,016,225 | Kerns | Jan. 30, 1912 |
| 1,233,839 | Burgess | July 17, 1917 |
| 1,256,347 | Meharry | Feb. 12, 1918 |
| 1,549,086 | Jones | Aug. 11, 1925 |
| 1,628,038 | Draper | May 10, 1927 |
| 1,737,160 | Johnston | Nov. 26, 1929 |
| 1,799,368 | Hendrickson | Apr. 7, 1931 |
| 1,971,495 | McGee et al. | Aug. 28, 1934 |
| 2,152,273 | Otto | Mar. 28, 1939 |
| 2,187,833 | Lock et al. | Jan. 23, 1940 |
| 2,244,857 | Sletten | Jan. 10, 1941 |
| 2,387,070 | Hilblom | Oct. 16, 1945 |
| 2,482,216 | Rust | Sept. 20, 1949 |
| 2,543,310 | Andrews et al. | Feb. 27, 1951 |